United States Patent [19]

Serlin et al.

[11] 4,386,184

[45] May 31, 1983

[54] COATING COMPOSITIONS COMPRISING ALLYLIC ALCOHOL INTERPOLYMERS

[75] Inventors: Irving Serlin; Donald M. Gardner, both of Springfield, Mass.

[73] Assignee: Monsanto Company, St. Louis, Mo.

[21] Appl. No.: 265,931

[22] Filed: May 21, 1981

[51] Int. Cl.³ .......................... C08K 3/26; C08K 3/10; C08L 25/06; B32B 5/16
[52] U.S. Cl. .................................. 524/425; 524/413; 524/420; 524/423; 524/432; 524/445; 524/448; 524/451; 524/503; 524/515; 524/523; 524/524; 525/57; 428/323; 428/331; 428/514
[58] Field of Search .......................... 260/42.22, 42.52; 526/326; 524/425, 503, 413, 420, 423, 432, 445, 448, 451, 515, 523, 524; 525/57

[56] References Cited

U.S. PATENT DOCUMENTS

| | | | |
|---|---|---|---|
| 2,940,946 | 6/1960 | Shokal et al. | 524/577 |
| 3,245,786 | 4/1966 | Cassiers et al. | 96/1 |
| 3,551,368 | 12/1970 | Sahni | 260/42.22 |
| 3,759,744 | 9/1973 | Schliesman | 117/218 |
| 4,046,941 | 6/1977 | Salto et al. | 428/323 |
| 4,130,670 | 9/1976 | Gilliams et al. | 428/353 |
| 4,161,453 | 7/1979 | Gilliams et al. | 260/23 ST |
| 4,165,308 | 8/1979 | Serlin | 260/42.52 |
| 4,167,602 | 9/1979 | Serlin | 428/513 |
| 4,239,858 | 12/1980 | Serlin | 260/33.6 UA |
| 4,259,425 | 3/1981 | Serlin | 428/513 |
| 4,262,099 | 4/1981 | Heaps et al. | 525/123 |
| 4,278,782 | 7/1981 | Heaps et al. | 526/326 |

*Primary Examiner*—Melyn I. Marquis
*Assistant Examiner*—H. J. Lilling
*Attorney, Agent, or Firm*—R. Bruce Blance; William J. Farrington; Paul D. Matukaitis

[57] ABSTRACT

Coating compositions comprising intimate blends of a pigment and an interpolymer of monovinyl aromatic monomer, allylic alcohol and optionally allylic ester, wherein the weight ratio of pigment to interpolymer is in the range of about 2:1 to about 10:1. The compositions are useful for the preparation of electrographic recording materials.

11 Claims, No Drawings

COATING COMPOSITIONS COMPRISING ALLYLIC ALCOHOL INTERPOLYMERS

This invention relates to a coating composition adapted for use in the preparation of electrographic recording materials.

In general, electrographic recording processes involve forming a latent image upon an electrically insulating charge-retentive layer of an electrographic recording material by impressing an electric charge corresponding to an original pattern and treating or developing the latent image by applying to the charge-retentive layer a colored resinous powder or toner which clings to the charged areas but which does not adhere to the uncharged areas. The developed image is then fixed by application of heat and/or pressure to the electrographic recording material to fuse the toner particles to the charge retentive layer and form a permanent visible image. The electrographic recording material comprises an electroconductive sheet support coated with the electrically insulating charge-retentive layer comprising an electrically insulating polymeric binder and optionally a pigment or filler. The coating is conventionally applied to the electroconductive sheet support as a dispersion of pigment in an organic solvent solution of the electrically insulating binder. In general the binder is an insulating resin of at least moderately high molecular weight, commonly selected from the group consisting of polyethylene, polyvinyl acetal, silicone resin, vinyl acetate copolymers, acrylate copolymers, and styrene-acrylate copolymers. The binder forms a substantially continuous film on the electroconductive sheet support when the organic solvent is evaporated from the solution. However, because of the high molecular weight of the binder resin, the solution is diluted with a considerable volume of solvent to provide a viscosity suitable for smooth and continuous coating.

According to the present invention, there is provided a coating composition comprising an intimate blend of a polymeric binder and from about 200 to about 1000 parts by weight of an inert finely divided pigment per 100 parts by weight of polymeric binder. The polymeric binder comprises a low molecular weight interpolymer comprising monovinyl aromatic monomer, a $C_3$-$C_7$ allylic alcohol and optionally an ester of a $C_3$-$C_7$ allylic alcohol and a monovalent carboxylic acid, wherein the glass transition temperature of the interpolymer is at least about 30° and wherein the number average molecular weight is in the range of about 700 to about 5000. We have discovered that these coating compositions may be used to prepare elecrographic recording materials by applying them to an electroconductive sheet support. The dispersions can contain as little as 10 weight percent of solvent and can thus reduce solvent demand, conserve energy required to evaporate the solvent from the coating and decrease the amount of solvent effluent discharged into the air when the coating is dried, without sacrifice in the performance of the electrographic recording material produced therefrom.

The monovinyl aromatic monomer of the interpolymer can be selected from among the large group of aromatic monomers which contain a vinyl group directly attached to an aromatic nucleus. The aromatic nucleus may be substituted or unsubstituted so long as the unsaturation of the vinyl group is not hindered as in alpha-methyl styrene. Among the substituents which may appear on the aromatic nucleus there may be mentioned lower alkyls such as methyl and ethyl, halogen such as chlorine, and the like. The nature of the aromatic nucleus is unimportant since it does not affect the interpolymerization reaction. Representative vinyl aromatic compounds include styrene, p-methylstyrene, o-methylstyrene, m-methylstyrene, 2,4-dimethylstyrene, p-chlorostyrene, p-ethylstyrene, beta-vinylnaphthalene and the like. The preferred species of vinyl aromatic is styrene.

The $C_3$-$C_7$ allylic alcohol can be selected from the group represented by the formula:

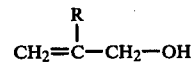

wherein R is hydrogen or a $C_1$-$C_4$ alkyl radical such as methyl, ethyl, propyl or n-butyl. The preferred allylic alcohol is allyl alcohol in which R is hydrogen.

The allylic ester is the ester of any of the above group of allylic alcohols and a monocarboxylic acid. Suitable acids include $C_1$-$C_{18}$ aliphatic carboxylic acids and $C_7$-$C_{14}$ aromatic acids. Examples of such acids include formic acid, acetic acid, propionic acid, lauric acid, oleic acid, stearic acid, benzoic acid, o-, m- and p-toluic acids, o-, m- and p-chlorobenzoic acids, o-, m- and p-nitrobenzoic acids, o-, m- and p-hydroxybenzoic acids and 1- and 2-naphthalic acids. The preferred allylic esters include allyl benzoate, allyl toluate, methallyl benzoate and methallyl toluate. An especially preferred allylic ester is allyl benzoate since it is prepared from readily available raw materials namely, allyl alcohol and benzoic acid.

The interpolymers can be prepared by interpolymerizing mixtures of the monomers by free radical methods at temperatures ranging from about 100° C. to above 250° C. in the presence of from 0.1 to 25% by weight of a peroxide or azo initiator having a decomposition temperature in excess of 90° C., the quantity of initiator being based on the weight and molecular weight of the interpolymer to be produced. The mixture of monomers selected to provide the desired ratio of monomers in the interpolymer is maintained in a mole ratio of monovinyl aromatic monomer to the sum of allylic alcohol and allylic ester from about 1:10 to 1:100 by incremental addition of monovinyl aromatic monomer. The great disparity in concentration of monovinyl aromatic monomer and allylic monomers throughout the polymerization is dictated by the great disparity in reactivity ratios. However, the ratio of allylic alcohol to allylic ester is similar to the ratio desired in the final interpolymer because their reactivities are essentially similar.

The interpolymers are conveniently prepared from the monomers by the methods set forth in U.S. Pat. Nos. 2,940,946 and 4,262,099 wherein polymerization is accompanied by programmed addition of the monovinyl aromatic monomer to maintain the relative concentrations of the monomers fairly constant although considerable latitude in the ratios is permitted without upsetting the desired ratio of monomers in the polymer. A uniform distribution of the allylic hydroxyl groups among the polymer molecules provides compatibility with organic solvents, polymers and reactants.

The number average molecular weight of the interpolymer is in the range of about 700 to about 5000 and is preferably in the range of about 900 to about 1800.

In general the interpolymer should contain at least about 40 weight percent of monovinyl aromatic monomer to allow the molecular weight to meet the minimum limit. When the monovinyl aromatic monomer content is less than about 40 weight percent, the molecular weight of the polymer is usually less than the desired minimum because of the excessive chain transfer activity of the allylic monomers and the need to use excessive amounts of initiator in order to achieve a significant amount of polymerization. On the other hand, the amount of monovinyl aromatic monomer in the interpolymer should not be too high because the interpolymer tends to become incompatible with co-reactants and with solvents and reaction products. Thus, to ensure compatibility with co-reactants and solvents and to provide a controlled degree of reactivity, the interpolymer should advantageously comprise about 40 to about 85 parts by weight of monovinyl aromatic units, and from about 15 to about 60 parts by weight of allylic alcohol and allylic ester units, the mol ratio of monovinyl aromatic units to allylic alcohol and allylic ester units being 3:1 or less, and more preferably it should comprise from about 50 to about 82 parts by weight of monovinyl aromatic units and from about 18 to about 50 parts by weight of allylic alcohol and allylic ester units, the mol ratio of monovinyl aromatic units to allylic alcohol and allylic ester units being 2.5 or less.

While the interpolymer may comprise only monovinyl aromatic monomer units and allylic alcohol units, the incorporation of allylic ester units in the interpolymer provides lower viscosity to the coating dispersions and superior humidity resistance and solvent hold-out to the dielectric or electrically insulating layers of electrographic recording materials prepared from the interpolymer. Advantageously, the mol ratio of allylic ester units to allylic alcohol units in the interpolymer is in the range of about 0.1 to about 10 and is preferably in the range of about 0.2 to about 4. Selection of an appropriate mol ratio is guided by the additional requirement that the glass transition temperature of the interpolymer should be at least about 30° C. and preferably above about 40° C. The glass transition temperature is conveniently determined by differential scanning calorimetry by means of the DuPont Differential Scanning Calorimeter Model 900, with a 0.1 to 0.3 g sample of interpolymer heated at a rate of 20° C. per minute in a nitrogen atmosphere. The midpoint of the glass transition is considered to be the glass transition temperature.

A convenient method of preparing the interpolymers comprising monovinyl aromatic monomer, allylic alcohol and allylic ester involves the preparation of an interpolymer of allylic alcohol and monovinyl aromatic monomer. Residual monomer is removed by distillation under reduced pressure and interpolymer is esterified with a monocarboxylic acid or transesterified with an ester of the acid and a lower alcohol, to provide an interpolymer with the desired molecular weight and the desired ratio of allylic alcohol, allylic ester and monovinyl aromatic monomer. The interpolymer of monovinyl aromatic monomer and allylic alcohol is of such a molecular weight that upon esterification, it yields an interpolymer of molecular weight in the range of about 700 to about 5000 and more preferably from about 900 to about 1800. It is understood that the interpolymer may comprise fractions of esterified and unesterified interpolymer of vinyl aromatic monomer and allylic alcohol and that the term, low-molecular weight interpolymer, encompasses blends of unesterified interpolymers, esterified interpolymers, and unesterified and esterified interpolymers, meeting the limitations of molecular weight and interpolymer composition set forth hereinabove.

The inclusion of a small amount of plasticizer or a low molecular weight polystyrene or poly (α-methylstyrene) in the coating composition can be helpful to prevent curling of electrographic recording materials prepared from the dispersion. The amount of such additive is generally not more than about 25 weight percent of the total weight of interpolymer and plasticizer.

The coating composition contains an organic solvent in which the interpolymer is dissolved and dispersed in the interpolymer solution an inert, non-photoconductive pigment. Appropriate solvents include the lower alcohols, ketones, esters and aromatic hydrocarbons and blends thereof and blends containing these solvents and the lower aliphatic and alicyclic hydrocarbons. Interpolymers containing high ratios of allylic alcohol may require some polar solvent to provide solubility in aromatic hydrocarbons. The non-photoconductive pigment may be organic or inorganic including pigments such as silica, calcined clay, zinc oxide, zinc sulfide, titanium dioxide, talc, calcium carbonate, diatomaceous earth, barium sulfate and lithopone. The mean particle size of the pigment defined as the size at which 50 weight percent of the pigment is coarser and 50 weight percent is finer, is preferably less than about 10 micron and is more preferably in the range of about 0.5 to about 5 micron. Especially preferred pigments are fine wet-ground calcium carbonates of mean particle size in the range of about 0.5 to about 5 microns, such as the calcium carbonate pigment sold by Thompson, Weinman and Company under the tradename Atomite. The amount of pigment is generally in the range of about 200 to about 1000 parts by weight per 100 parts by weight of interpolymer and is preferably in the range of about 250 to about 500 parts per 100 parts. The solids content of the dispersion is generally in the range of about 40 to about 90 weight percent and is preferably in the range of about 50 to about 80 weight percent to provide dispersions with adequate coating viscosity and minimal amount of solvent.

The amount or weight of the coating composition applied to an electroconductive sheet support in the preparation of an electrographic recording material should be sufficient to provide a uniform coating substantially free of defects which might impair the quality of the image reproduced on the insulating layer. The amount can be in the range of about 2 to about 20 g dry weight per sq.m. of recording material, preferably from about 4 to about 12 g. per sq.m. However, smaller amounts may suffice if a sufficient electrostatic charge can be applied without the risk of breakdown.

In general, paper is used as the sheet support, although other supports such as metal foils or sheets, textile materials, and plastic films such as films of cellulose triacetate or of polyester e.g. of polyethylene terephthalate can also be used. In comparison to the insulating layer, the support must have a much higher electric conductance as will be described more clearly hereinafter.

The electroconductivity of normal paper is rather low, especially when it has been coated with a covering layer of a coating composition such as the composition of the present invention. Therefore, the electroconductivity of the paper should be enhanced to obtain an appropriate electrographic recording material. This can be accomplished e.g. by the addition of salts such as potassium nitrate and/or conductive polymers to the wood pulp during the paper making. A favorable electroconductivity of the paper can also be obtained by impregnating the paper already formed with solutions of salts and/or conductive polymers. Good results are obtained also with paper carrying on at least one side a conductive layer serving as an intermediate layer between the support and the insulating layer. This conductive layer may be composed of e.g. conductive polymers. Surface resistivity values in the range of about $1 \times 10^7$ to $1 \times 10^{10}$ ohm/sq. for the support allow a normal charging of the insulating surface. Indeed, it should be taken into account, that the surface resistivity values of the insulating layer, when measured in the same way, are normally much higher and will show values of $1 \times 10^{11}$ to $1 \times 10^{14}$ ohm/s. or even more.

What has been said above concerning the improvement of the conductivity of paper by the application thereto of conductive polymers also applies to other supports. By the application of conductive polymers to at least one side of these supports a satisfactory electroconductivity can also be obtained. Of course, it may sometimes be necessary, for example, when highly hydrophobic films are used as supports e.g. films of polyethylene terephthalate, to provide these film supports first with a known subbing layer or combination of layers to secure a sufficient adhesion of the layers coated thereon.

The electrographic recording material prepared from coating compositions of the invention can be used in an electrostatic printing apparatus wherein an electrostatic charge pattern is built up on the insulating layer by conventional means such as by moving the material in close contact with electroconductive styli or by transferring an electrostatic charge pattern from a photoconductive drum. The electrostatic latent charge pattern formed on the insulating layer can be developed according to techniques known in the art, e.g. by means of a two-component developer composed of a toner and a carrier material or by liquid electrophoretic development. The developed pattern is then made permanent or fixed by application of heat or pressure to fuse the toner to the insulating layer.

The invention is further described and illustrated in the following examples which should not be construed as limiting its scope. All parts and percentages are by weight unless otherwise indicated.

EXAMPLE 1

A uniform dispersion of a wet-ground calcium carbonate pigment sold by Thompson, Weinman and Company under the tradename Atomite and an interpolymer of styrene, allyl alcohol and allyl benzoate in toluene is prepared by adding the pigment incrementally to the interpolymer solution while the solution is stirred slowly in a blender and when all the pigment has been added, subjecting the mixture to high speed blending for 2 minutes. The interpolymer comprises 60.4 weight percent styrene, 11.3 weight percent allyl alcohol, and 28.3 weight percent allyl benzoate. Its number average molecular weight is 1430, its inherent viscosity, determined with a methyl ethyl ketone solution containing 1 g of interpolymer per dl of solution, is 0.052 at 25° C., and its glass transition temperature is 45° C. The solids content of the dispersion is 70 weight percent, the pigment content is 52.5 weight percent, and the interpolymer content is 17.5 weight percent. The dispersion viscosity measured on a Brookfield viscometer, with the no. 3 spindle at 100 rpm is 74 cps.

An electroconductive base supplied by Crown Zellerbach Co. and identified as narrow range PL-496 is coated on the wire side by means of a Meyer number 3 wire wound rod with the calcium carbonate interpolymer solution dispersion to provide a dry coating weight of 8.0 g/sq.m. The coated paper is allowed to dry and is stored for 16 hours at 22° C. and 50 percent relative humidity. It is then printed at 50 percent relative humidity in a 900A Versatec printer using the MTE-15 Test Exerciser. The print density determined with the Welch Scientific Company's Densichron Instrument using the black filter and standardized against the Reflection Standard No. 2 at a density of 0.505 is 0.78. When a sample of the coated paper is creased and wrinkled, no separation of the interpolymer coating from the base paper occurs.

A series of papers of increasing coating weight is prepared from the calcium carbonate interpolymer solution dispersion by applying the dispersion to the base paper with coarser wire wound roads. The following weight and print densities are obtained.

| coating weight, g/sq.m. | print density |
|---|---|
| 8.0 | 0.78 |
| 9.2 | 0.90 |
| 10.3 | 0.88 |
| 11.4 | 0.91 |
| 15.5 | 0.93 |

The print density obtained with commercial Versatec paper is 0.85.

EXAMPLE 2

A dispersion of a calcium carbonate in a solution of interpolymer is prepared by the method of example 1. The interpolymer comprises 67.8 weight percent styrene, 19.5 weight percent allyl alcohol and 12.7 weight percent allyl benzoate. Its number average molecular weight is 1276 and its glass transition temperature is 51° C. The solids content of the dispersion is 65 weight percent. The dispersion viscosity is 72 cps. The pigment:binder ratio is 3:1.

A coated paper is prepared by applying the dispersion to the paper support of example 1 with a Meyer number 5 wire wound rod to provide a coating weight of 9.5 per sq. meter. A Versatec print, obtained from the coated paper, has a print density of 0.86.

EXAMPLE 3

A dispersion of calcium carbonate in a solution of interpolymer is prepared by the method of example 1 using a blend of toluene and ethanol in the weight ratio of 93:7 as the solvent. The interpolymer comprises 80.7 weight percent styrene, and 19.3 weight percent allyl alcohol. Its number average molecular weight is 1589 and its glass transition temperature is 61° C. The solids content of the dispersion is 65 weight percent. The dispersion viscosity is 67 cps. The pigment to binder ratio is 3:1.

A coated paper is prepared by applying the dispersion to the paper support of example 1 with a Meyer number 5 wire wound rod to provide a coating weight of 9.9 g/sq.m. A Versatec print, obtained from the coated paper, has a print density of 0.80.

EXAMPLE 4

A dispersion of calcium carbonate in a solution of interpolymer is prepared by the method of example 1. The interpolymer comprises 73.8 weight percent styrene and 26.2 weight percent allyl alcohol. Its number average molecular weight is 1172, its inherent viscosity determined with a methyl ethyl ketone solution containing 1 g. of interpolymer per dl. of solution is 0.038 at 25° C., and its glass transition temperature is 55° C. The solids content of the dispersion is 65 weight percent. The dispersion viscosity is 51 cps. The pigment:binder ratio is 3:1.

A coated paper is prepared by applying the dispersion to the paper support of example 1 with a Meyer number 5 wire wound rod to provide a coating weight of 9.8 g/sq.m. A Versatec print, obtained from the coated paper, has a print density of 0.84.

EXAMPLE 5

A dispersion of calcium carbonate is prepared according to example 1 with a toluene solution of a poly (α-methylstyrene) of number average molecular weight 960. A pasty dispersion forms and can not be coated on the electroconductive base sheet. Addition of ethanol to the dispersion gives no improvement.

What is claimed is:

1. An electrographic coating composition comprising an intimate dispersion of a polymeric binder and from 200 to 1000 parts by weight of a finely divided non-photoconductive pigment per 100 parts by weight of the polymeric binder, wherein the polymer binder comprises an interpolymer comprising from about 40 to about 85 parts by weight of monovinyl aromatic monomer units and from about 15 to about 60 parts by weight of units of a $C_3-C_7$ allylic alcohol and a monocarboxylic acid, wherein the mol ratio of monovinyl aromatic units to allylic alcohol and allylic ester units is about 3:1 or less, the mol ratio of allylic ester units to allylic alcohol units is in the range of 0 to about 10, the number average molecular weight of the interpolymer is in the range of about 700 to about 5000, the glass temperature of the interpolymer is at least about 30° C. and the solids content of the coating composition is in the range of about 40 to about 90 weight percent.

2. The coating composition of claim 1 wherein the interpolymer comprises from about 50 to about 82 parts by weight of monovinyl aromatic units and from about 18 to about 50 parts of allylic alcohol and allylic ester units, the mol ratio of monovinyl aromatic units to allylic alcohol and allylic ester units is about 2.5 or less, and the number average molecular weight of the interpolymer is in the range of about 900 to about 1800.

3. The coating composition of claim 1 or 2 wherein the monovinyl aromatic monomer is styrene, the allylic alcohol is allyl alcohol and the allylic ester is allyl benzoate.

4. The coating composition of claim 1 or 2 wherein the finely divided pigment is selected from the group consisting of silica, calcined clay, zinc oxide, zinc sulfide, titanium dioxide, talc, calcium carbonate, diatomaceous earth, barium sulfate and lithopone.

5. The coating composition of claim 1 or 2 wherein the finely divided pigment is wet-ground calcium carbonate of mean particle diameter less than about 10 microns.

6. The coating composition of claim 3 wherein the finely divided pigment is wet-ground calcium carbonate of mean particle diameter in the range of about 0.5 to about 5 microns and the solids content of the coating composition is in the range of about 50 to about 80 weight percent.

7. An electrographic coating composition comprising an intimate dispersion of a polymeric binder and from 200 to 1000 parts by weight of a finely divided non-photoconductive pigment per 100 parts by weight of the polymeric binder, wherein the polymeric binder comprises an interpolymer comprising from about 40 to about 85 parts by weight of monovinyl aromatic monomer units and from about 15 to about 60 parts by weight of units of a $C_3-C_7$ allylic alcohol and a monocarboxylic acid, wherein the mol ratio of monovinyl aromatic units to allylic alcohol and allylic ester units is about 3:1 or less, the mol ratio of allylic ester units to allylic alcohol units is in the range of 0.1 to about 10, the number average molecular weight of the interpolymer is in the range of about 700 to about 5000, the glass temperature of the interpolymer is at least about 30° C. and the solids content of the coating composition is in the range of about 40 to about 90 weight percent.

8. The coating composition of claim 7 wherein the monovinyl aromatic monomer is styrene, the allylic alcohol is allyl alcohol and the allylic ester is allyl benzoate.

9. The coating composition of claim 8 wherein the finely divided pigment is selected from the group consisting of silica, calcined clay, zinc oxide, zinc sulfide, titanium dioxide, talc, calcium carbonate, diatomaceous earth, barium sulfate and lithopone.

10. The coating composition of claim 8 wherein the finely divided pigment is wet-ground calcium carbonate of mean particle diameter in the range of about 0.5 to about 5 microns and the solids content of the coating composition is in the range of about 50 to about 80 weight percent.

11. The coating composition of claim 8, 9 or 10 wherein the allylic ester units of the interpolymer are present in a ratio of about 0.2 to about 4 allylic ester units per allylic alcohol unit.

* * * * *